US012580327B2

(12) United States Patent
Miwa

(10) Patent No.: US 12,580,327 B2
(45) Date of Patent: Mar. 17, 2026

(54) CRIMP TERMINAL, TERMINAL COUPLED BODY AND CONNECTOR

(71) Applicant: HIROSE ELECTRIC CO., LTD., Yokohama (JP)

(72) Inventor: Shinnosuke Miwa, Yokohama (JP)

(73) Assignee: HIROSE ELECTRIC CO., LTD., Kanagawa (JP)

( * ) Notice: Subject to any disclaimer, the term of this patent is extended or adjusted under 35 U.S.C. 154(b) by 278 days.

(21) Appl. No.: 18/489,974

(22) Filed: Oct. 19, 2023

(65) Prior Publication Data

US 2024/0145943 A1 May 2, 2024

(30) Foreign Application Priority Data

Oct. 28, 2022 (JP) ................................ 2022-173212
May 1, 2023 (JP) ................................ 2023-075421

(51) Int. Cl.
*H01R 4/18* (2006.01)
*H01R 4/16* (2006.01)

(52) U.S. Cl.
CPC ................ *H01R 4/18* (2013.01); *H01R 4/16* (2013.01)

(58) Field of Classification Search
CPC .......... H01R 4/18; H01R 4/16; H01R 13/113; H01R 4/188
USPC ........................................................ 439/877
See application file for complete search history.

(56) References Cited

U.S. PATENT DOCUMENTS

| | | | | |
|---|---|---|---|---|
| 7,591,694 B2 * | 9/2009 | Osada | H01R 4/185 439/852 |
| 9,009,962 B2 * | 4/2015 | Sugie | H01R 43/16 29/874 |
| 2020/0169032 A1 | 5/2020 | Hirano | |

FOREIGN PATENT DOCUMENTS

| | | |
|---|---|---|
| JP | H09-129347 A | 5/1997 |
| JP | 2020-87730 A | 6/2020 |

* cited by examiner

*Primary Examiner* — Tulsidas C Patel
*Assistant Examiner* — Jeffrey Mountain
(74) *Attorney, Agent, or Firm* — Rankin, Hill & Clark LLP

(57) ABSTRACT

A crimp terminal includes a crimped part crimped to a cable; and a terminal connection part provided to be bent with respect to the crimped part. The cramped part includes: a base part on which the cable extending in a first axial direction is placed; and a barrel piece protruding from the base part in one direction of a second axial direction orthogonal to the first axial direction, and caulked to be crimped to the cable. The terminal connection part is extended in one direction of a third axial direction orthogonal to the first axial direction and the second axial direction.

5 Claims, 13 Drawing Sheets

CRIMP TERMINAL, TERMINAL COUPLED BODY AND CONNECTOR

INCORPORATION BY REFERENCE

This application is based on and claims the benefit of priority from Japanese patent applications No. 2022-173212 filed on Oct. 28, 2022 and No. 2023-075421 files on May 1, 2023, which is incorporated by reference in its entirety.

BACKGROUND

The present invention relates to a crimp terminal crimped to a cable, a terminal coupled body and a connector.

A connector contact terminal (hereafter referred to as a "contact terminal") formed in a linear line (a rod shape) by a pinching part for crimping a wire harness and an electrical contact part extended from the tip of the pinching part is disclosed. A plurality of the contact terminals forms a connector contact terminal member (hereafter referred to as a "terminal member") by connecting the base ends of the pinching parts to one side of a band-shaped carrier part. The terminal member is mounted on a terminal crimping device, and the terminal crimping device separates the contact terminal from the carrier part while sending the terminal member out, and caulks the pinching part to crimp it to the wire harness (cable).

By the way, when the connector provided with the linear contact terminal is connected to a counter connector, both the connectors need to be arranged on the same axis. For example, if the counter connector is mounted on an electrical board, the wire harness needs to be drawn around and bent so that the connector faces the counter connector. Therefore, in order to carry out the work of connecting both the connectors, it is necessary to secure a wide space for arranging both the connectors, and there is a problem in which the size of the apparatus provided with both the connectors is large.

For the above problems, a L-shaped terminal is known, which has a terminal connection part extending in the front-and-rear direction, a wire connection part extending in the upper-and-lower direction and connected to the terminal of the wire, and a plate shaped coupling part coupling the terminal connection part to the wire connection part. In this terminal, the coupling part couples the flat portion connected to the terminal connection part and the flat portion connected to the wire connection part, and is bent at right angles around the axis extending in the left-and-right direction. According to the connector provided with such an L-shaped terminal, it is possible to easily connect it to the counter connector mounted on the electrical board, for example, without bending the wire forcibly.

However, when a terminal member is formed by coupling the above-described L-shaped terminals to the carrier part, the terminal connection parts protrude largely in the front-and-rear direction with respect to the surface of the carrier part. When the terminal member is mounted on the terminal crimping device, the terminal connection part protruding largely from the carrier part interferes with the anvil or the like of the terminal crimping device, and it becomes impossible to send the terminals to the anvil. Then, the crimping work (caulking work) in the terminal crimping device cannot be performed.

SUMMARY

A first crimp terminal of the present invention includes: a crimped part crimped to a cable; and a terminal connection part provided to be bent with respect to the crimped part, wherein the crimped part includes: a base part on which the cable extending in a first axial direction is placed; and a barrel piece protruding from the base part in one direction of a second axial direction orthogonal to the first axial direction, and caulked to be crimped to the cable, and the terminal connection part is extended in one direction of a third axial direction orthogonal to the first axial direction and the second axial direction.

A second crimp terminal of the present invention includes: a crimped part crimped to a cable; a terminal connection part provided to be bent with respect to the crimped part; and a coupling part coupling the crimped part to the terminal connection part, wherein the crimped part includes: a base part on which the cable extending in a first axial direction is placed; and a barrel piece protruding from the base part in one direction of a second axial direction orthogonal to the first axial direction, and caulked to be crimped to the cable, and the coupling part is bent with respect to the base part in one direction of the second axial direction around a first axis extending in the first axial direction while a tip end of the coupling part is directed to one direction of a third axial direction orthogonal to the first axial direction and the second axial direction, and the terminal connection part is extended from the tip end of the coupling part in one direction of the third axial direction.

A third crimp terminal of the present invention may be configured such that, in the second crimp terminal the coupling part includes: a first support part protruding from the base part in one direction of the second axial direction on one side of the barrel piece in the first axial direction; and a second support part extending from one end in the first axial direction of the first support part to one direction of the third axial direction, and the terminal connection part is extended from a tip end of the second support part to one direction of the third axial direction.

A fourth crimp terminal of the present invention may be configured such that, in the third crimp terminal, the first support part includes: a pair of support plates protruding from both ends in the third axial direction of the base part to one direction of the second axial direction; and a bridge plate provided between tip ends of the support plates, and the second support part is connected to one of the support plates.

A fifth crimp terminal of the present invention may be configured such that, in the first crimp terminal, the terminal connection part is formed in a rectangular cylindrical shape having a connection space inside and a connection opening opened to one end surface in the third axial direction, the terminal connection part includes: a first flat plate extending from one end in the first axial direction of the base part to one direction of the second axial direction and extending to one direction of the third axial direction; a pair of side plates extending from both ends in the second axial direction of the first flat plate to one direction of the first axial direction; and a second flat plate connected to one end in the first axial direction of at least one of the side plates and facing the first flat plate with a gap.

A sixth crimp terminal of the present invention may be configured such that, in the fifth crimp terminal, the terminal connection part further includes a reinforcing piece extending from the other end in the third axial direction of one of the first flat plate and the second flat plate toward the other of the first flat plate and the second flat plate, and a tip end of the reinforcing piece faces the other of the first flat plate or the second flat plate with a slight gap or in contact with.

A first terminal coupled body of the present invention is a terminal coupled body in which a plurality of the first crimp terminal is connected to a carrier formed in a band shape extending in the third axial direction at intervals in the third axial direction, wherein the crimp terminal is connected to the carrier such that the base part is in a posture parallel to a surface of the carrier and a base end of the base part, which is the other end in the first axial direction, is connected to one end in the first axial direction of the carrier.

A second terminal coupled body of the present invention may be configured such that the first terminal coupled body is wound around a reel with the barrel piece of the crimp terminal connected to the carrier facing outward.

A connector of the present invention includes the first crimp terminal and a housing for housing the crimp terminal.

The above and other objects, features, and advantages of the present disclosure will become more apparent from the following description when taken in conjunction with the accompanying drawings in which a preferred embodiment of the present disclosure is shown by way of illustrative example.

DETAILED DESCRIPTION

Hereinafter, with reference to the attached drawings, embodiments of the present invention will be described. X1, X2, Y1, Y2, Z1 and Z2 in each figure show the left, right, front, rear, upper and lower. In addition, an "upper-and-lower direction", a "front-and-rear direction" and a "left-and-right direction" are examples of a "first axial direction", a "second axial direction" and a "third axial direction" in the claims, respectively, and are orthogonal to each other. Directional and positional terms are used in the specification for illustrative convenience, and are not intended to limit the technical scope of the invention.

Figure 1:
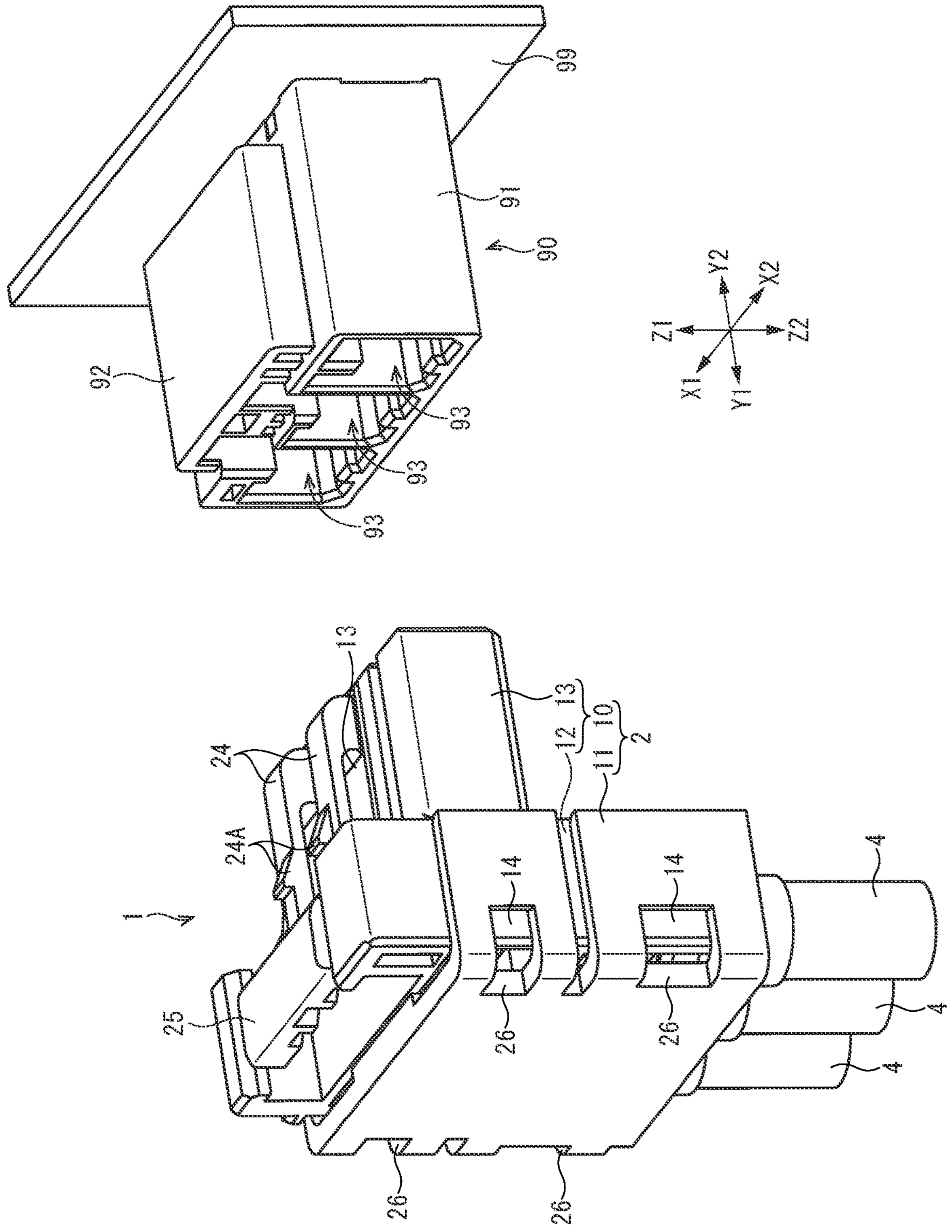
FIG. 1 is a perspective view showing a connector and a counter connector according to one embodiment of the present invention.
Figure 2:
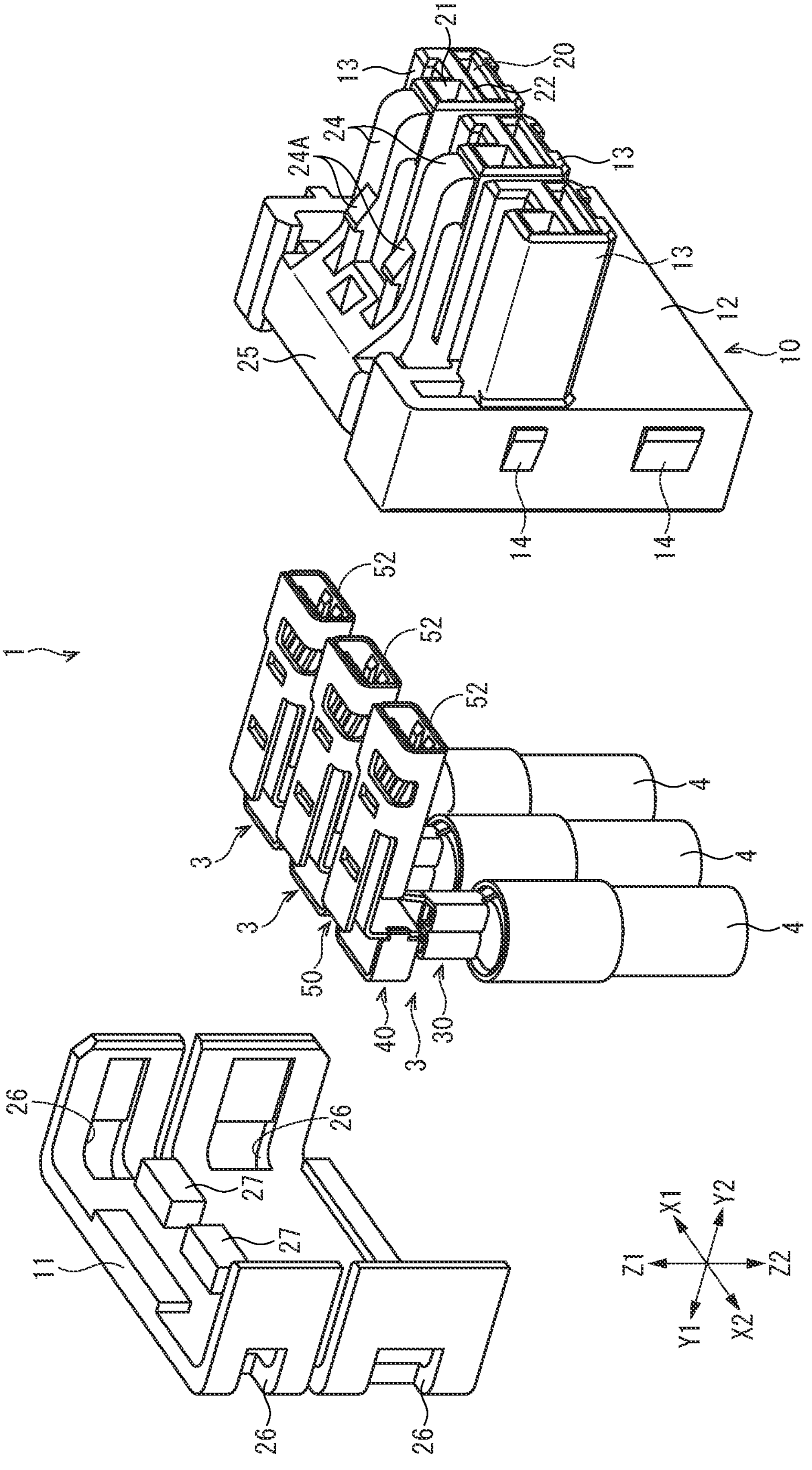
FIG. 2 is a disassembled perspective view showing the connector according to the embodiment of the present invention.
Figure 3:
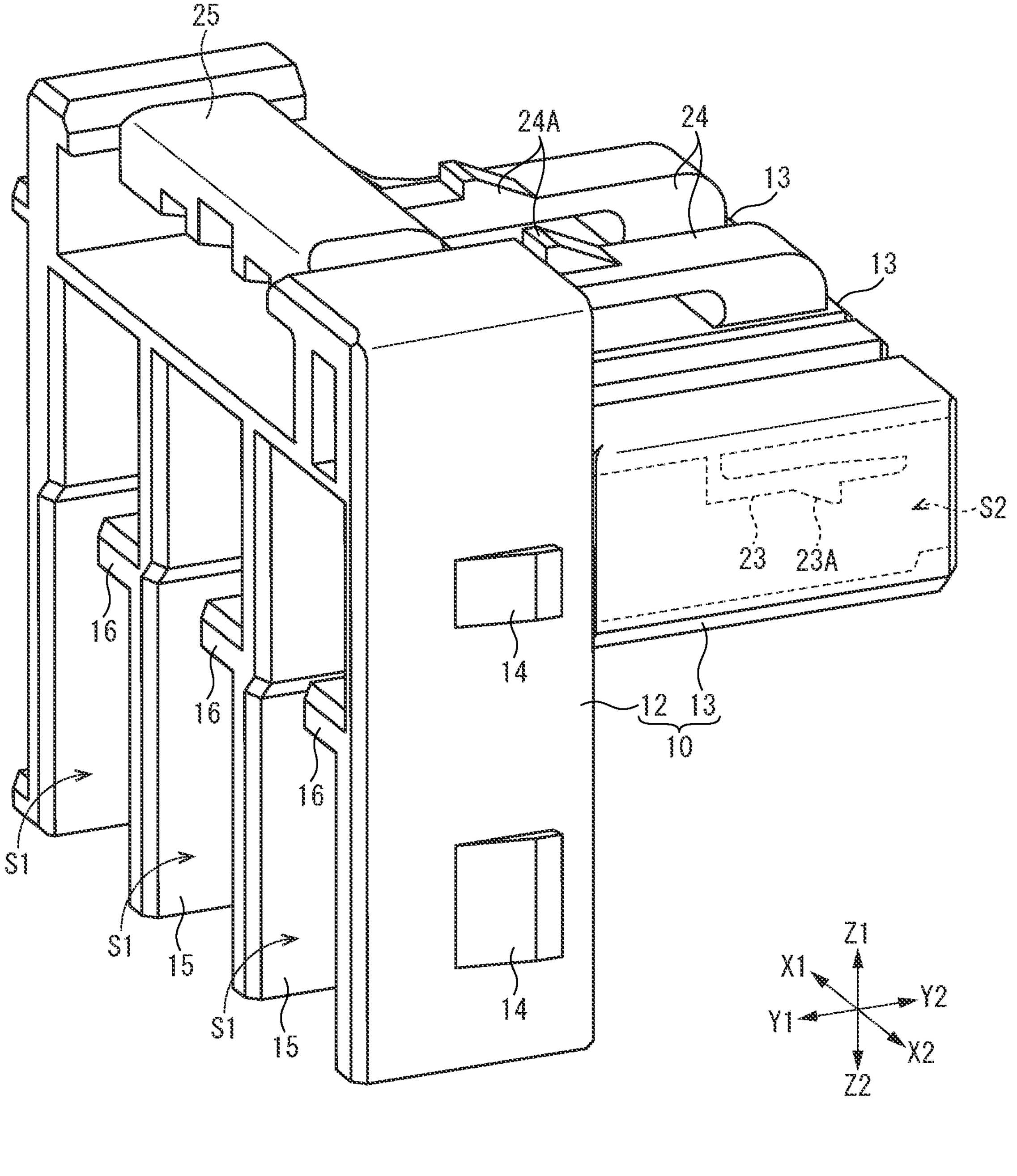
FIG. 3 is a perspective view showing a housing part of a housing of the connector according to the embodiment of the present invention.
Figure 4A:
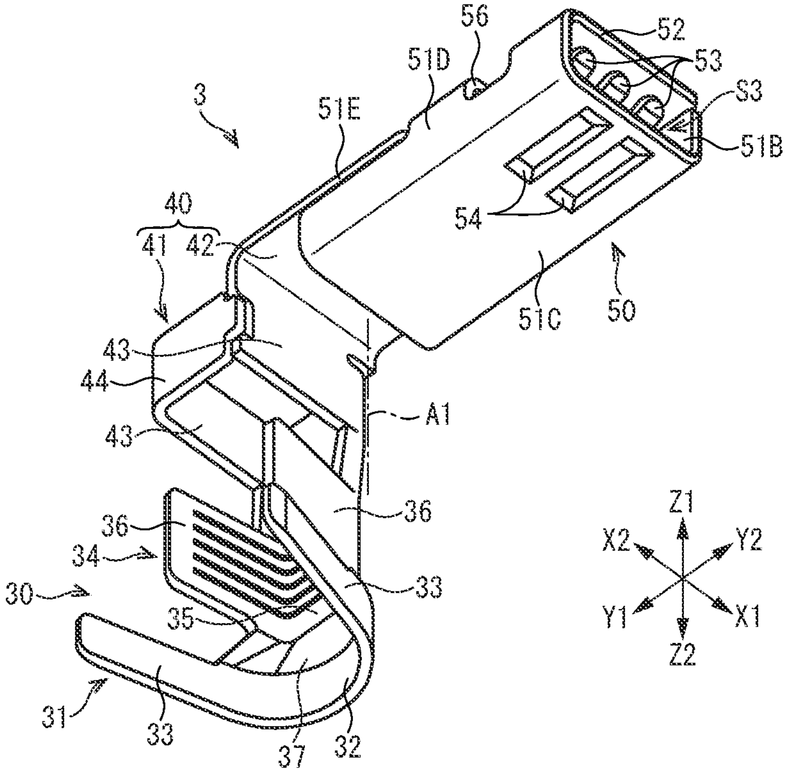
FIG. 4A is a perspective view (diagonally downward) showing a crimp terminal according to the embodiment of the present invention.
Figure 4B:
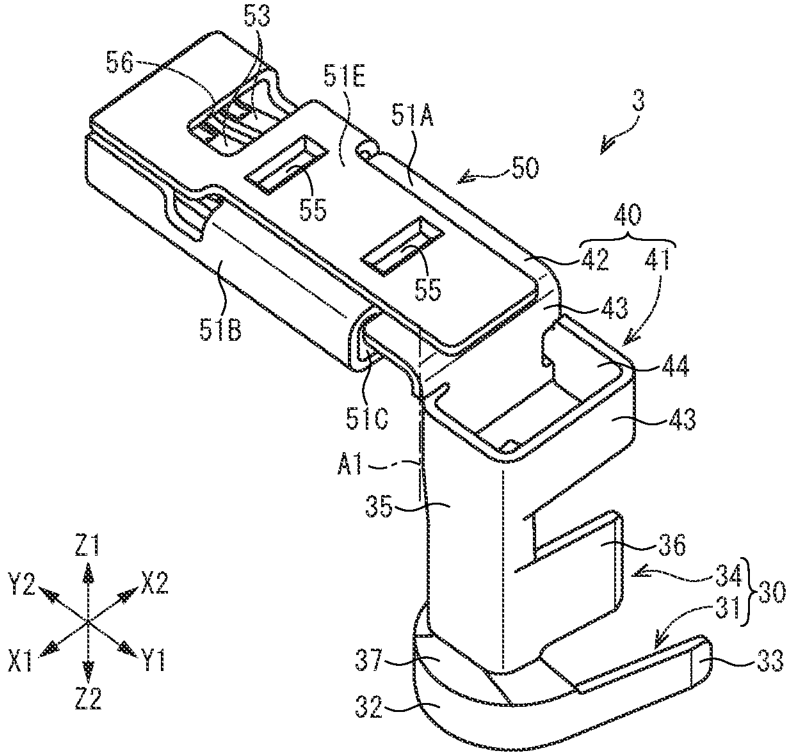
FIG. 4B is a perspective view (diagonally upward) showing the crimp terminal according to the embodiment of the present invention.
Figure 5:
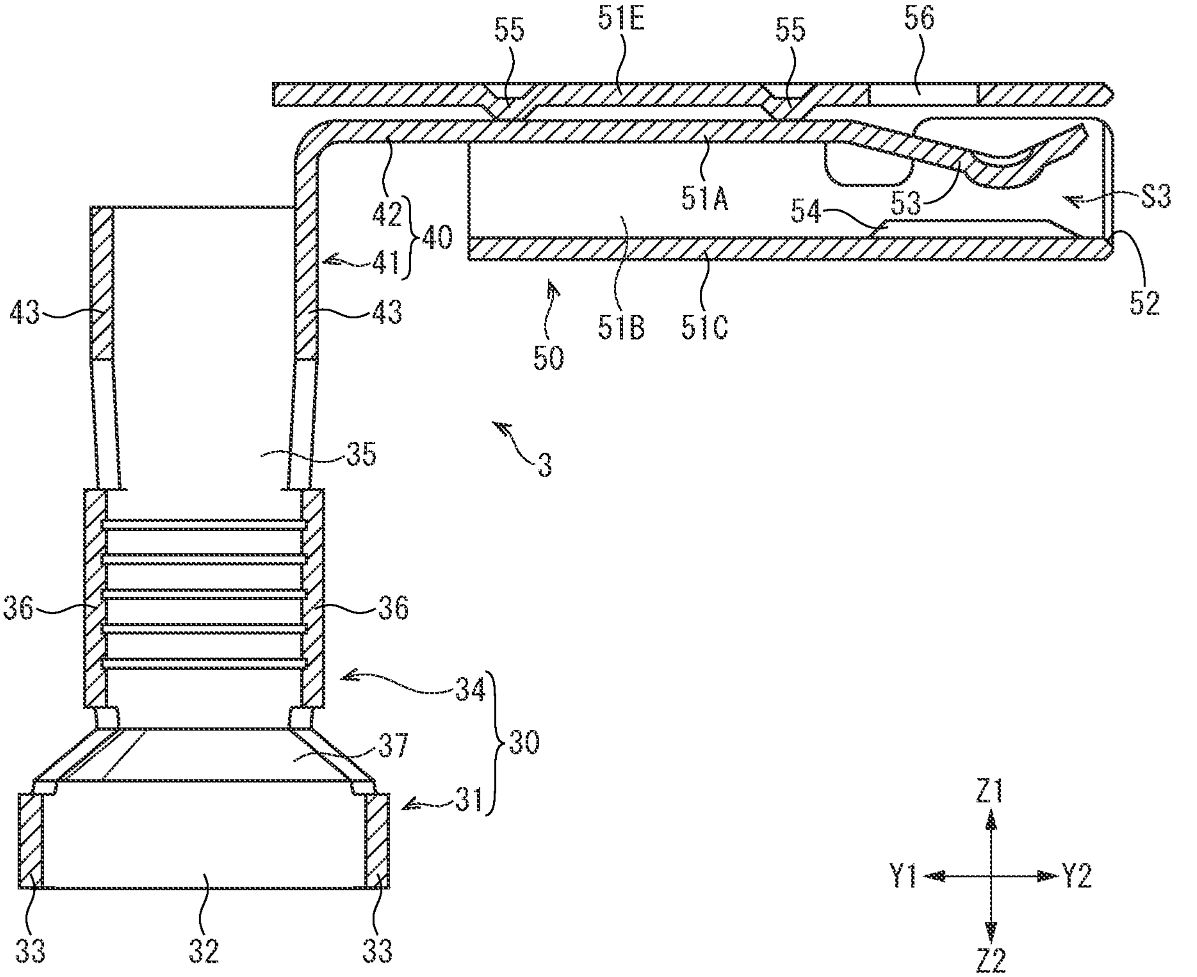
FIG. 5 is a cross-sectional view showing the crimp terminal according to the embodiment of the present invention.

With reference to FIG. 1 to FIG. 5, a connector 1 according to the embodiment will be described. FIG. 1 is a perspective view showing the connector 1 and a counter connector 90. FIG. 2 is a disassembled perspective view showing the connector 1. FIG. 3 is a perspective view showing a housing part 10 of a housing 2 of the connector 1. FIG. 4A and FIG. 4B are perspective views showing a crimp terminal 3. FIG. 5 is a cross-sectional view showing the crimp terminal 3.

As shown in FIG. 1, the connector 1 is attached to the tips of three cables 4, and is configured to be fittable to the counter connector 90 mounted on an electrical board 99. The counter connector 90 will be briefly described below prior to the description of the connector 1.

[Counter Connector] The counter connector 90 is configured by housing three counter terminals (not shown) in a counter housing 91. The counter housing 91 is, for example, made of non-conductive synthetic resin, and is formed into an approximately rectangular cylindrical shape with both the front and rear end surfaces opened. The counter housing 91 stands on the front surface of the electrical board 99 provided in a nearly vertical posture. A pair of locked parts 92 is provided on the upper portion of the counter housing 91 to keep the connection with the connector 1. The inside of the counter housing 91 is divided into three spaces in the left-and-right direction, and three fitting holes 93 are opened on the front end surface of the counter housing 91 to correspond to the three spaces. The three counter terminals are disposed in the three spaces inside the counter housing 91, and are electrically connected to the electrical board 99. The counter connector 90 (counter terminal) is not limited to be mounted on the electrical board 99, and may be attached to the tip of the cable 4, for example, in the same way as the connector 1 according to the embodiment (not shown).

[Connector] As shown in FIG. 1 and FIG. 2, the connector 1 includes the housing 2 which forms the main appearance and three crimp terminals 3 which are housed in the housing 2. Since the three crimp terminals 3 have the same structure, the description mainly describes one crimp terminal 3. In the present embodiment, three counter terminals are provided on the counter connector 90 and three crimp terminals 3 are provided on the connector 1, but the present embodiment is not limited to this, and one or more counter terminals and crimp terminals 3 may be provided.

<Housing> The housing 2 is made of synthetic resin, for example, and is configured to be separable into the housing part 10 and a cover part 11.

(Housing Part) As shown in FIG. 2 and FIG. 3, the housing part 10 has a housing body part 12 formed in a box-like shape with the front and lower surfaces opened, and three fitting protruding parts 13 each formed in an approximately rectangular cylindrical shape and protruding rearward from the upper portion of the rear surface of the housing body part 12.

(Housing Body Part) A pair of upper and lower mounting claw parts 14 is protruded on both the left and right outer surfaces of the housing body part 12. As shown in FIG. 3, the inside of the housing body part 12 is divided into three first housing spaces S1 by two partition walls 15 extending in the upper-and-lower direction and disposed with intervals in the left-and-right direction. Positioning ribs 16 are protruded on the inner surface of the housing body part 12 and on the two partition walls 15 such that each first housing space S1 is divided into two spaces in the upper-and-lower direction. Each positioning rib 16 partitions the right side space of the first housing space S1 while leaving a gap in a part of the left side space of the first housing space S1.

(Fitting Protruding Part) As shown in FIG. 3, inside each fitting protruding part 13, second housing spaces S2 communicating with the first housing spaces S1 are formed. Each second housing space S2 is integrated with the first housing space S1 to constitute an approximately L-shaped space when viewed in a cross section from the lateral direction. The crimp terminal 3 is housed in the approximately L-shaped space, described in detail later. As shown in FIG. 2, on the rear end surface of each fitting protruding part 13, a connection hole 20 and a release hole 21 are opened on both sides of a contact part 22 in the upper-and-lower direction so as to communicate with the second housing space S2. The release hole 21 is opened above the connection hole 20 and on the right side of the connection hole 20.

Each fitting protruding part 13 has a lance part 23 that extends downward from the upper surface, then bends to extend rearward. The lance part 23 is configured so as to be elastically deformable in the upper-and-lower direction around the bent portion. A terminal claw part 23A is protruded on the tip end portion of the lower surface of the lance part 23.

As shown in FIG. 2 and FIG. 3, a pair of lock arms 24 is extended rearward while bending from the upper surfaces of the center and left fitting protruding parts 13. The pair of lock arms 24 is configured so as to be elastically deformable in the upper-and-lower direction around the bent portions. On the upper surface of each lock arm 24, a lock claw part 24A is protruded. In addition, an operation part 25 is provided between the tip end portions (front end portions) of the upper surfaces of the lock arms 24.

(Cover Part) As shown in FIG. 1 and FIG. 2, the cover part 11 is formed in an approximately U-shape with the rear surface opened when viewed from a plane. A pair of upper and lower mounting holes 26 is opened in the left and right side walls of the cover part 11. The cover part 11 is mounted to cover both the left and right outer surfaces of the housing body part 12, and each mounting claw part 14 of the housing body part 12 is fitted (locked) into each mounting hole 26 of the cover part 11 from the inside. On the side wall of the cover part 11, a slit is cut between the upper and lower mounting holes 26.

As shown in FIG. 2, three pressing parts 27 are protruded on the inner surface of the front wall of the cover part 11 (FIG. 2 shows the two pressing parts 27). In a state where the cover part 11 is attached to the housing body part 12 (the housing part 10), the pressing parts 27 are positioned above the positioning ribs 16.

<Crimp terminal> The crimp terminal 3 is made of metal, formed in an approximately L-shape, and is fixed to the tip of the cable 4. As shown in FIG. 2, the crimp terminal 3 includes a crimped part 30 crimped to the cable 4, a terminal connection part 50 bent with respect to the crimped part 30, and a coupling part 40 coupling the crimped part 30 and the terminal connection part 50. The crimp terminal 3 is formed by being punched out of a single metal plate and bending it. That is, the crimped part 30, the terminal connection part 50 and the coupling part 40 are formed integrally.

Here, the cable 4 has a core wire (not shown) made of conductor (metal) and a covering part (not shown) made of insulator and covering the core wire. The core wire is exposed by striping the tip end portion of the covering part of the cable 4.

(Crimped Part) As shown in FIG. 4A, FIG. 4B and FIG. 5, the crimped part 30 has a covering crimped part 31 and a core wire crimped part 34.

The covering crimped part 31 has a covering base part 32 formed to be curved when viewed from the bottom surface, and a pair of covering barrel pieces 33 protruding from both the front and rear ends of the covering base part 32 rightward (one direction of the second axial direction). The covering base part 32 and the pair of covering barrel pieces 33 are formed in an approximately U-shape when viewed from the bottom surface. On the covering base part 32, the covering part of the cable 4 extending in the upper-and-lower direction is placed. The pair of covering barrel pieces 33 are caulked to wrap the covering part placed on the covering base part 32 and then crimped to the covering part.

The core wire crimped part 34 has a core wire base part 35 formed in an approximately flat plate shape and a pair of core wire barrel pieces 36 protruding rightward from both the front and rear ends of the core wire base part 35. The core wire base part 35 is connected to the upper end of the covering base part 32 through an inclined plate part 37. The inclined plate part 37 is inclined rightward from the covering base part 32 toward the core wire base part 35, and a step corresponding to the thickness of the covering part of the cable 4 is formed between the covering base part 32 and the core wire base part 35. The core wire base part 35 and the pair of core wire barrel pieces 36 are formed in an approximately U-shape when viewed from the bottom surface (or plan surface). The core wire of the cable 4 extending in the upper-and-lower direction is placed on the core wire base part 35. The core wire barrel pieces 36 are caulked to wrap the core wire placed on the core wire base part 35 and then crimped to the core wire. The core wire base part 35 is extended upward from a position where the pair of core wire barrel pieces 36 are provided.

(Coupling Part) As shown in FIG. 4A and FIG. 4B, the coupling part 40 is bent rightward (one direction of the second axial direction) around a first axis A1 extending in the upper-and-lower direction (the first axial direction) with respect to the core wire base part 35, with its tip facing rearward (one direction of the third axial direction). As a specific example, as shown in FIG. 4A and FIG. 4B and FIG. 5, the coupling part 40 has a first support part 41 protruding rightward (one direction of the second axial direction) from the core wire base part 35 and a second support part 42 extending rearward from the upper end of the first support part 41 above the core wire barrel pieces 36 (one direction of the first axial direction).

The first support part 41 has a pair of support plates 43 protruding rightward from both the front and rear ends of the core wire base part 35 and a bridge plate 44 provided between the tips of the support plates 43. The support plates 43 are bent rightward approximately at right angles with respect to the core wire base part 35, and face each other in an approximately parallel manner with a space between them in the front-and-rear direction. The bridge plate 44 is formed integrally with the front support plate 43, and the tip end (rear end) of the bridge plate 44 is abutted against the right end of the rear support plate 43. In detail, a protrusion part formed at the tip end of the bridge plate 44 is fitted into a recess formed at the right end of the rear support plate 43. As described above, the first support part 41 (the pair of support plates 43, the bridge plate 44) are formed in an approximately U-shape when viewed from the plane, and the first support part 41 and the core wire base part 35 constitute an approximately rectangular cylinder shape when viewed from the plane.

The second support part 42 is connected to the upper end of the rear support plate 43 and extended rearward. The second support part 42 is formed by bending the portion extending upward from the rear support plate 43 downward approximately at right angles with respect to the rear support plate 43.

(Terminal Connection Part) As shown in FIG. 4A, FIG. 4B and FIG. 5, the terminal connection part 50 extends from the tip end (rear end) of the second support part 42 of the coupling part 40 rearward (one direction of the third axial direction). The terminal connection part 50 is formed into an approximately rectangular cylinder having an approximately rectangular cross section whose longer sides are along the left-and-right direction by folding an inner upper plate 51A, a left side plate 51B, a bottom plate 51C, a right side plate 51D and an outer upper plate 51E in a roll. A connection space S3 is formed inside the terminal connection part 50, and a connection opening 52 for inserting the counter terminal of the counter connector 90 is opened on the rear end surface of the terminal connection part 50.

The inner upper plate 51A is formed by extending the second support part 42 rearward. At the rear portion of the inner upper plate 51A, three pressure-contact pieces 53 are provided at intervals in the left-and-right direction. Each pressure-contact piece 53 extends diagonally downward from the front side (base portion) to the rear side, and its tip portion is bent diagonally upward (see FIG. 5). Each pressure-contact piece part 53 is provided so as to be elastically deformable in the upper-and-lower direction around the base portion.

The left side plate 51B is bent approximately at right angles with respect to the inner upper plate 51A, and extended downward from the left end of the inner upper plate 51A. The bottom plate 51C is bent approximately at right angles with respect to the left side plate 51B, and extended rightward from the lower end of the left side plate 51B. The bottom plate 51C faces the inner upper plate 51A from below across the connection space S3. In the rear portion of the bottom plate 51C, two pressure-contact protrusions 54 are protruded toward the connection space S3 (upward) with an interval in the left-and-right direction. The right side plate 51D is bent approximately at right angles with respect to the bottom plate 51C, and extended upward from the right end of the bottom plate 51C.

The outer upper plate 51E is bent approximately at right angles with respect to the right side plate 51D, extended leftward from the upper end of the right side plate 51D, and is laminated on the upper surface of the inner upper plate 51A. The outer upper plate 51E is formed in a rectangular shape slightly longer than the length of both the inner upper plate 51A and the second support part 42 in the front-and-rear direction. On the outer upper plate 51E, a pair of support protruding parts 55 is protruded with an interval in the front-and-rear direction so as to come into contact with the upper surface of the inner upper plate 51A. The outer upper plate 51E is in contact with the inner upper plate 51A with only the pair of support protruding parts 55, and the portion other than the pair of support protruding parts 55 is separated upward from the inner upper plate 51A by the height of the support protruding parts 55. A locking hole 56 is drilled in the rear portion of the terminal connection part 50 from the upper portion of the right side plate 51D to the outer upper plate 51E.

Figure 6:
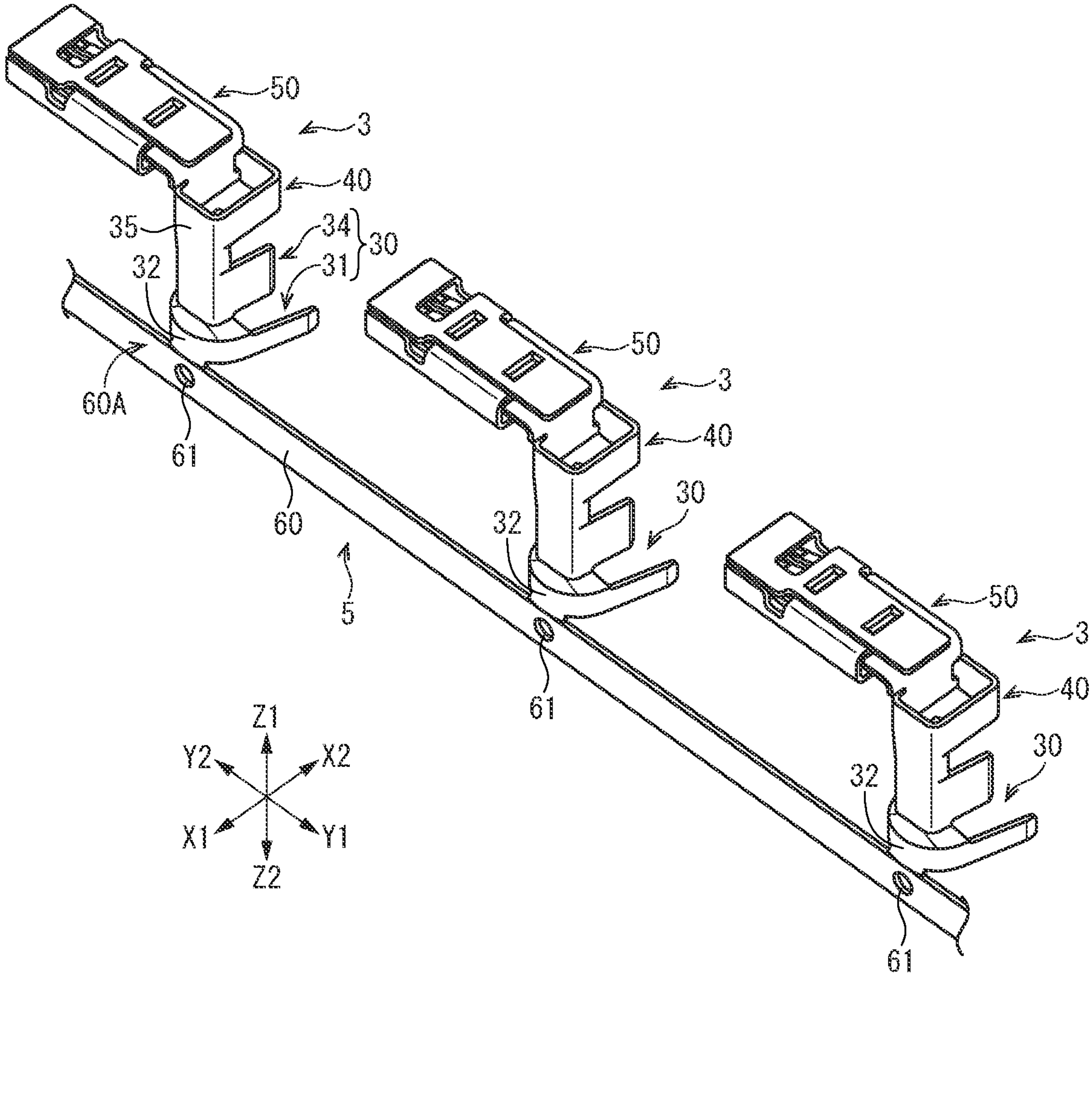
FIG. 6 is a perspective view showing a terminal coupled body according to the embodiment of the present invention.
Figure 7:
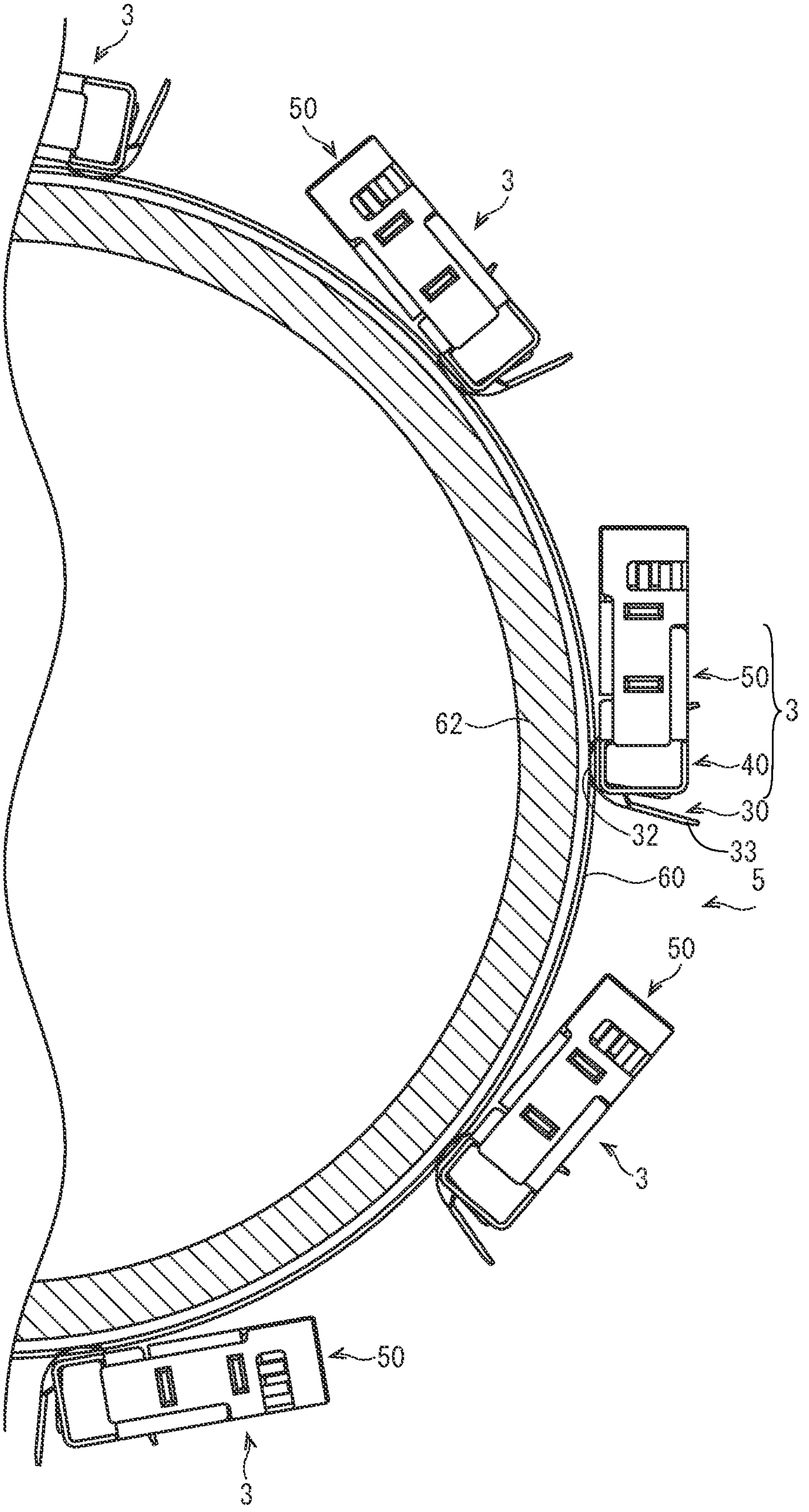
FIG. 7 is a plan view showing a state where the terminal coupled body according to the embodiment of the present invention is wound around a reel.

(Terminal coupled body) Next, with reference to FIG. 6 and FIG. 7, the terminal coupled body 5 according to the present embodiment will be described. FIG. 6 is a perspective view showing the terminal coupled body 5. FIG. 7 is a plan view showing the terminal coupled body 5 wound around a reel 62.

As shown in FIG. 6, the above-described crimp terminals 3 are coupled to a carrier 60 formed in a band-like shape extending in the front-and-rear direction (the third axial direction) at intervals in the front-and-rear direction to form the terminal coupled body 5. The terminal coupled body 5 (the crimp terminals 3, the carrier 60) is formed, for example, by punching out a long metal plate with a punching die. The punched crimp terminal 3 is in a flat developed plate state (not shown). The above-described crimped part 30, the terminal connection part 50 and the coupling part 40 are formed by applying bending processing to the developed crimp terminal 3.

The crimp terminal 3 is extended upward from the upper end of the carrier 60. In detail, in the crimp terminal 3, the covering base part 32 (the core wire base part 35) is in a posture parallel to the surface 60A of the carrier 60, and the lower end of the covering base part 32 (the base end which is the other end in the first axial direction) is connected to the upper side of the carrier 60 (one end in the first axial direction). The carrier 60 has a plurality of feed holes 61 drilled at the same intervals as the crimp terminals 3.

As shown in FIG. 7, the terminal coupled body 5 is wound around the reel 62 with each barrel piece 33, 36 and the coupling parts 40 of the crimp terminals 3 connected to the carrier 60 facing outward. The reel 62 is formed in an approximately cylindrical shape, and mounted rotatably around an axis on a terminal crimping device (not shown).

[Crimping Process] Here, the process of fixing the crimp terminal 3 to the cable 4 (crimping process) will be briefly described. The crimp terminal 3 is crimped to the cable 4 by the terminal crimping device.

The terminal crimping device is equipped with a terminal conveying part (not shown) that fits a protrusion with the feed holes 61 of the carrier 60 and feeds the terminal coupled body 5 from the reel 62. The terminal conveying part feeds the terminal coupled body 5 from the reel 62, and sends the crimp terminal 3 on the upper surface of the anvil while laying the carrier 60 along the insertion groove of the cut-off die (not shown). Then, the terminal crimping device pushes down the cut-off die and the crimper positioned above the anvil. Then, because the cut-off die moves lower than the anvil, shear force acts on the joint between the crimp terminal 3 (covering base part 32) and the carrier 60, and the crimp terminal 3 is separated from the carrier 60. At the same time, the crimped part 30 is held between the anvil and the crimper and crimped to the cable 4. Specifically, the pair of covering barrel pieces 33 is caulked and crimped to the covering part of the cable 4, and the pair of core wire barrel pieces 36 are caulked and crimped to the core wire of the cable 4. Thus, the crimp terminal 3 is fixed to the tip of the cable 4 (see FIG. 2). In FIG. 2, a specific illustration of the covering crimped part 31 is omitted.

Although the terminal crimping device is used to fix the crimp terminal 3 to the cable 4 in this embodiment. But, for example, an operator may fix (crimp) manually the crimp terminal 3 to the cable 4 using a crimping tool.

Figure 8:
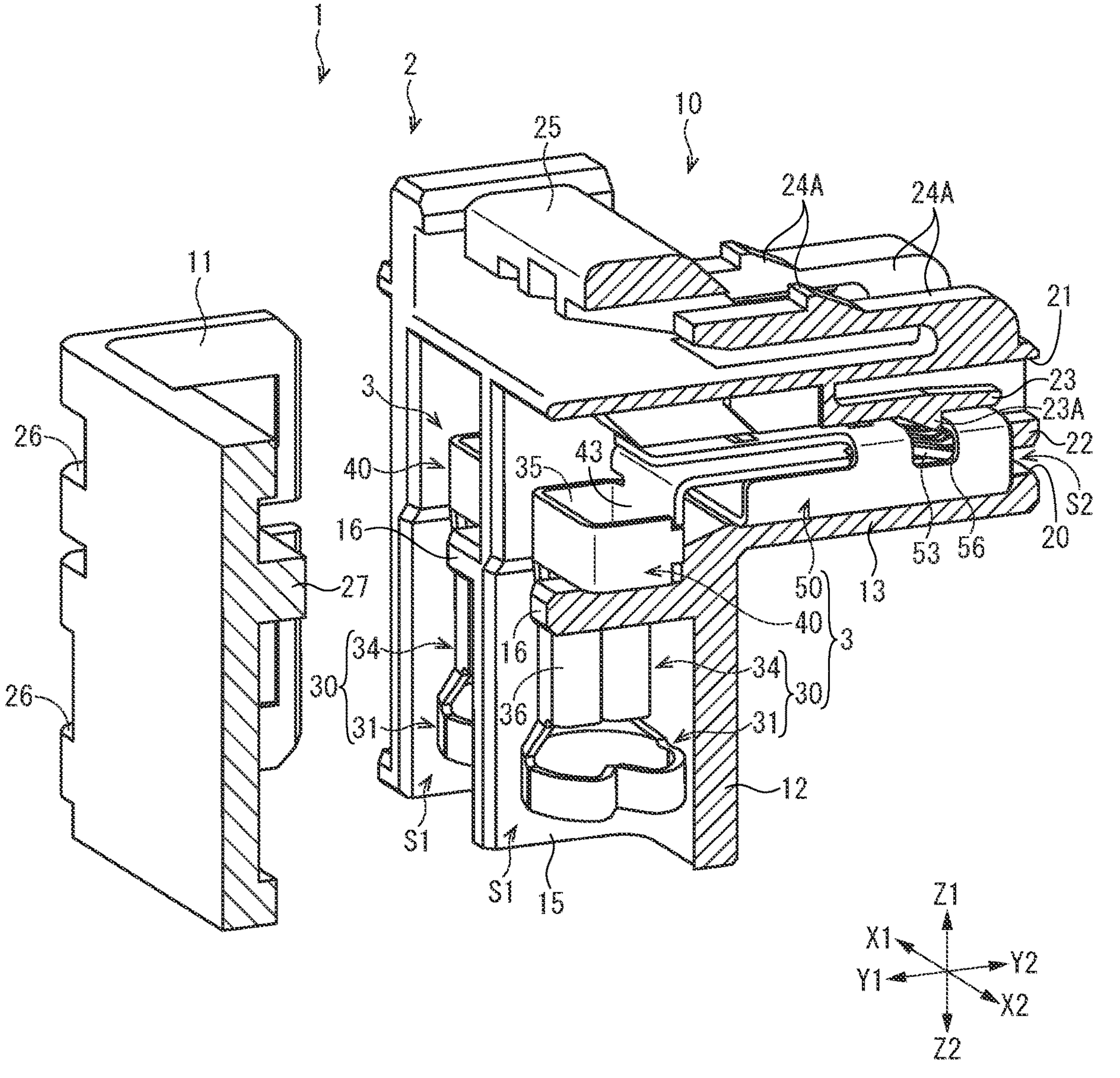
FIG. 8 is a disassembled perspective view showing a cross section of the connector according to the embodiment of the present invention.
Figure 9:
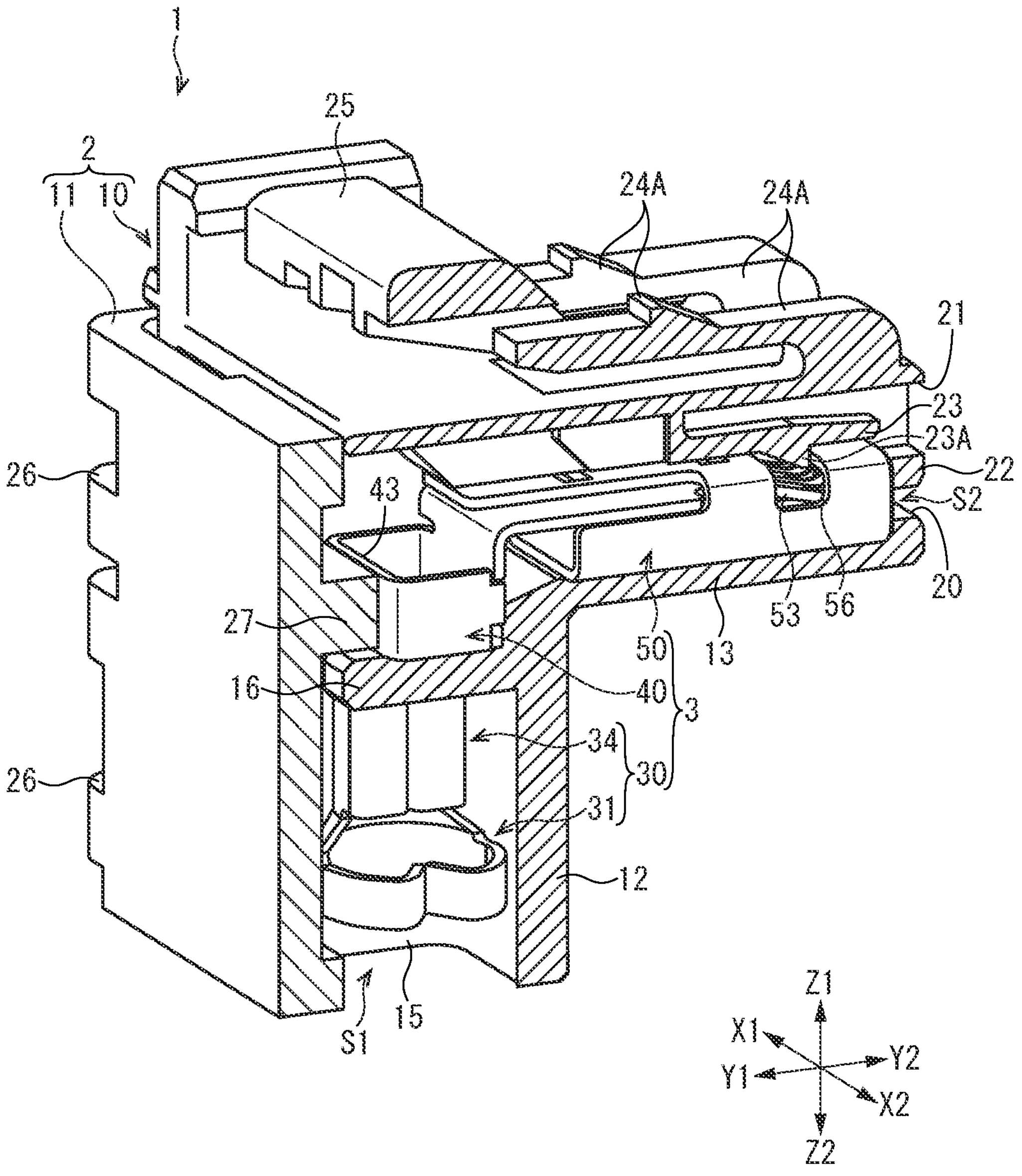
FIG. 9 is a perspective view showing the cross part of the connector according to the embodiment of the present invention.

[Assembling of Connector] Next, with reference to FIG. 1, FIG. 2, FIG. 8 and FIG. 9, the assembling procedure of the connector 1 will be described. FIG. 8 is a disassembled perspective view showing a cross section of the connector 1. FIG. 9 is a perspective view showing the cross section of the connector 1. In FIG. 8 and FIG. 9, the cable 4 is not shown.

The operator inserts the terminal connection part 50 of the crimp terminal 3 into the second housing spaces S2 of the fitting protruding parts 13 of the housing 2. The terminal connection part 50 (the outer upper plate 51E) is in contact with the terminal claw parts 23A of the lance parts 23, and is inserted while elastically deforming the lance part 23 upward. As the terminal connection part 50 is inserted, the terminal claw part 23A moves relatively forward while being pressed against the upper surface of the outer upper plate 51E by the restoring force (elastic force) of the lance part 23, and is fitted into the locking hole 56 of the outer upper plate 51E (see FIG. 8). In this state, the tip end (rear end) of the terminal connection part 50 comes into contact with the edge portion (the contact part 22) of the connection hole 20 (see FIG. 8), and the connection opening 52 (also see FIG. 2) of the terminal connection part 50 faces (communicates with) the connection hole 20.

As shown in FIG. 8, in a state where the terminal claw part 23A is locked to the locking hole 56, the crimped part 30 of the crimp terminal 3 is fitted into the first housing space S1 of the housing body part 12 of the housing 2. Specifically, the core wire base part 35 between the core wire barrel piece 36 and the coupling part 40 is inserted into the left side gap of the first housing space S1 formed by the positioning rib 16, and the coupling part 40 is fitted into the upper space of the first housing space S1 divided by the positioning ribs 16. In other words, the positioning rib 16 is fitted between the pair of core wire barrel pieces 36 and the coupling part 40. The rear support plate 43 of the coupling part 40 comes into contact with the upper portion of the rear inner surface of the housing body part 12. The cable 4 is extended outward from the lower surface of the housing body part 12 (the first housing space S1) (not shown).

The operator attaches the cover part 11 to the housing part 10 so as to cover the crimp terminals 3 housed in each of the housing space S1, S2. As shown in FIG. 1 and FIG. 9, the housing body part 12 of the housing part 10 is relatively fitted inside the cover part 11, and each mounting claw part 14 of the housing body part 12 is locked to each mounting hole 26 of the cover part 11 (see FIG. 1). In this state, each pressing part 27 of the cover part 11 is pressed against the coupling part 40 (the front support plate 43) of the crimp terminal 3 housed in the first housing space S1 (see FIG. 9). As a result, each crimp terminal 3 is mounted immovably inside the housing 2.

By the above process, the connector 1 is completed (see FIG. 1). When detaching the crimp terminal 3 from the housing 2, the operator should detach the cover part 11 from the housing body part 12, insert a thin needle-shaped jig into the release hole 21 of the fitting protruding part 13, elastically deform the lance part 23 upward to release the terminal claw part 23A from the locking hole 56, and pull the crime terminal 3 out of each of the housing space S1, S2.

[Connection between Connector and Counter Connector] When the connector 1 is connected to the counter connector 90, the operator inserts the three fitting protruding parts 13 of the connector 1 into the three fitting holes 93 of the counter connector 90, and inserts the pair of lock arms 24 of the connector 1 into the pair of locked parts 92 of the counter connector 90 (not shown). Each counter terminal relatively enters the connection space S3 through connection opening 52, is inserted while elastically deforming the three pressure-contact pieces 53 upward, and is held between the three pressure-contact pieces 53 and the two pressure-contact protrusions 54 (not shown). The lock claw part 24A of each lock arm 24 is locked to the recess inside the locked part 92 (not shown). Thus, the connector 1 is connected to the counter connector 90. When the connector 1 is separated from the counter connector 90, the operator can pull it out while pushing the operation part 25 down and releasing the locking state of the lock claw part 24A (not shown).

The crimp terminal 3 according to the present embodiment described above is configured such that the coupling part 40 is bent so as to be turned approximately at right angles around the first axis A1 with respect to the core wire base part 35, the tip end (rear end) of the coupling part 40 is directed rearward (one direction of the third axial direction), and the terminal connection part 50 is extended rearward from the tip end of the coupling part 40 (see FIG. 4A and FIG. 4B). According to this configuration, since the terminal connection part 50 extends in the direction that forms the same plane as the core wire base part 35, for example, when the crimp terminals 3 are coupled to the carrier 60 to form the terminal coupled body 5, the terminal connection part 50 can be made to be along the extending direction of the carrier 60 (see FIG. 6). Thus, even in the case of the L-shaped crimp terminal 3, it can be coupled to the carrier 60, and the crimping work in the terminal crimping device becomes possible.

In addition, according to the crimp terminal 3 according to the present embodiment, since the first support part 41 forms an approximately U-shaped structure by the pair of support plates 43 and the bridge plate 44, the rigidity (strength) of the first support part 41 can be improved compared with, for example, the case where the first support part 41 is formed by only one support plate 43. Thus, the terminal connection part 50 connected to one support plate 43 via the second support part 42 can be reliably supported.

According to the terminal coupled body 5 according to the present embodiment, the terminal connection part 50 can be along the extending direction of the carrier 60 (see FIG. 6). Thus, for example, the L-shaped crimp terminal 3 connected to the carrier 60 can be send on the anvil of the terminal crimping device, and the crimping process by the terminal crimping device can be properly carried out.

Also, in the terminal coupled body 5 according to the present embodiment, since the terminal connection part 50 extends along the extending direction of the carrier 60, even if the terminal coupled body 5 is wound around the reel 62, the terminal connection part 50 extends along the circumferential direction (winding direction) (see FIG. 7). According to the configuration, the terminal coupled body 5 can be properly wound around the reel 62, and the wound terminal coupled body 5 can also be properly fed (unwound).

According to the connector 1 according to the embodiment, since the crimp terminal 3 is formed in an L-shape, for example, the cable 4 can be easily connected to the counter connector 90 mounted on the electrical board 99 without forcibly bending the cable 4. This eliminates the need to make the space for arranging both the connectors 1 and 90 wider than necessary, and makes it possible to decrease of the size of the device equipped with both the connectors 1, 90.

Figure 10A:
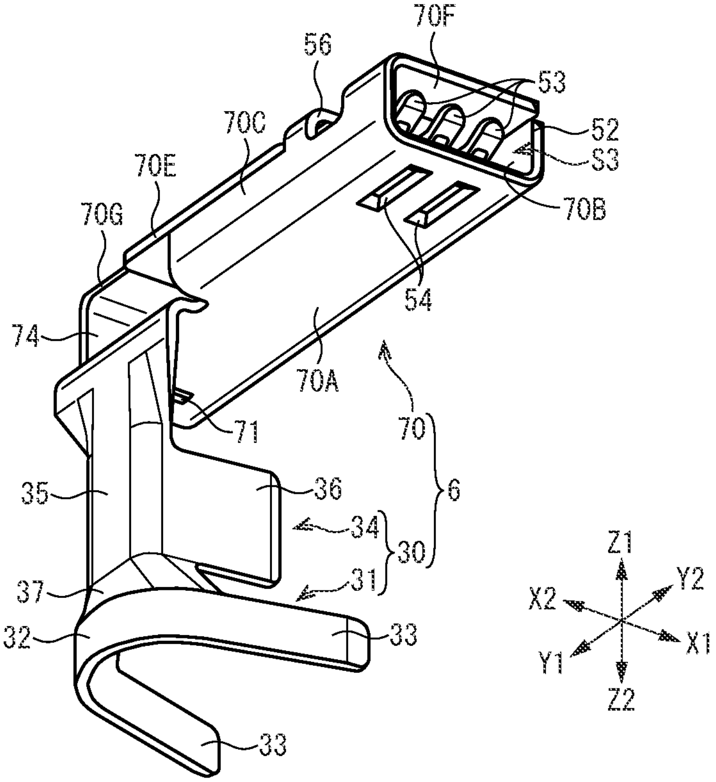
FIG. 10A is a perspective view (diagonally downward) showing the crimp terminal according to a modified example of the embodiment of the present invention.
Figure 10B:
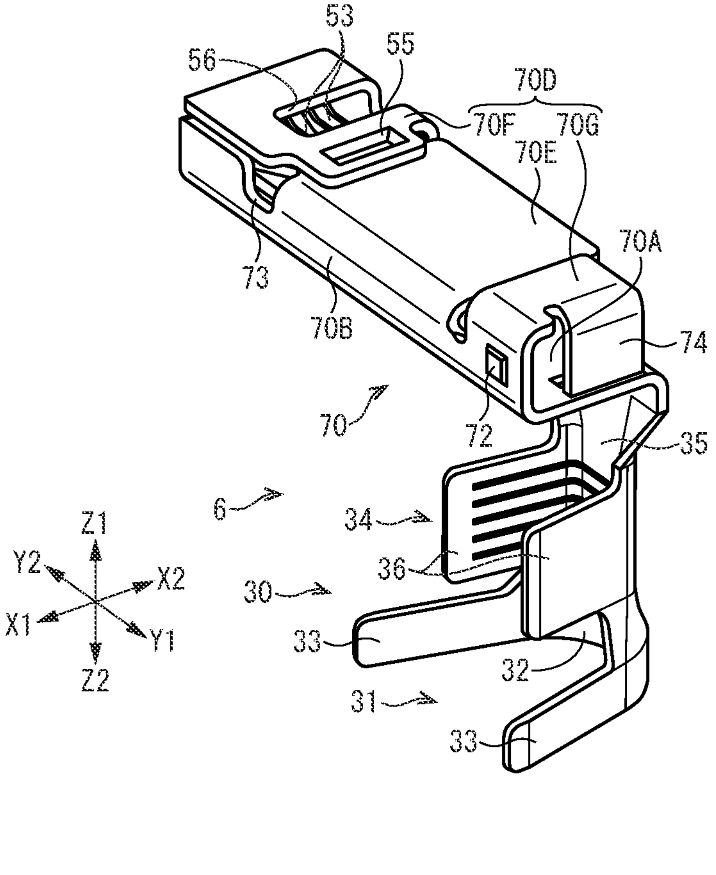
FIG. 10B is a perspective view (diagonally upward) showing the crimp terminal according to the modified example of the embodiment of the present invention.
Figure 11:
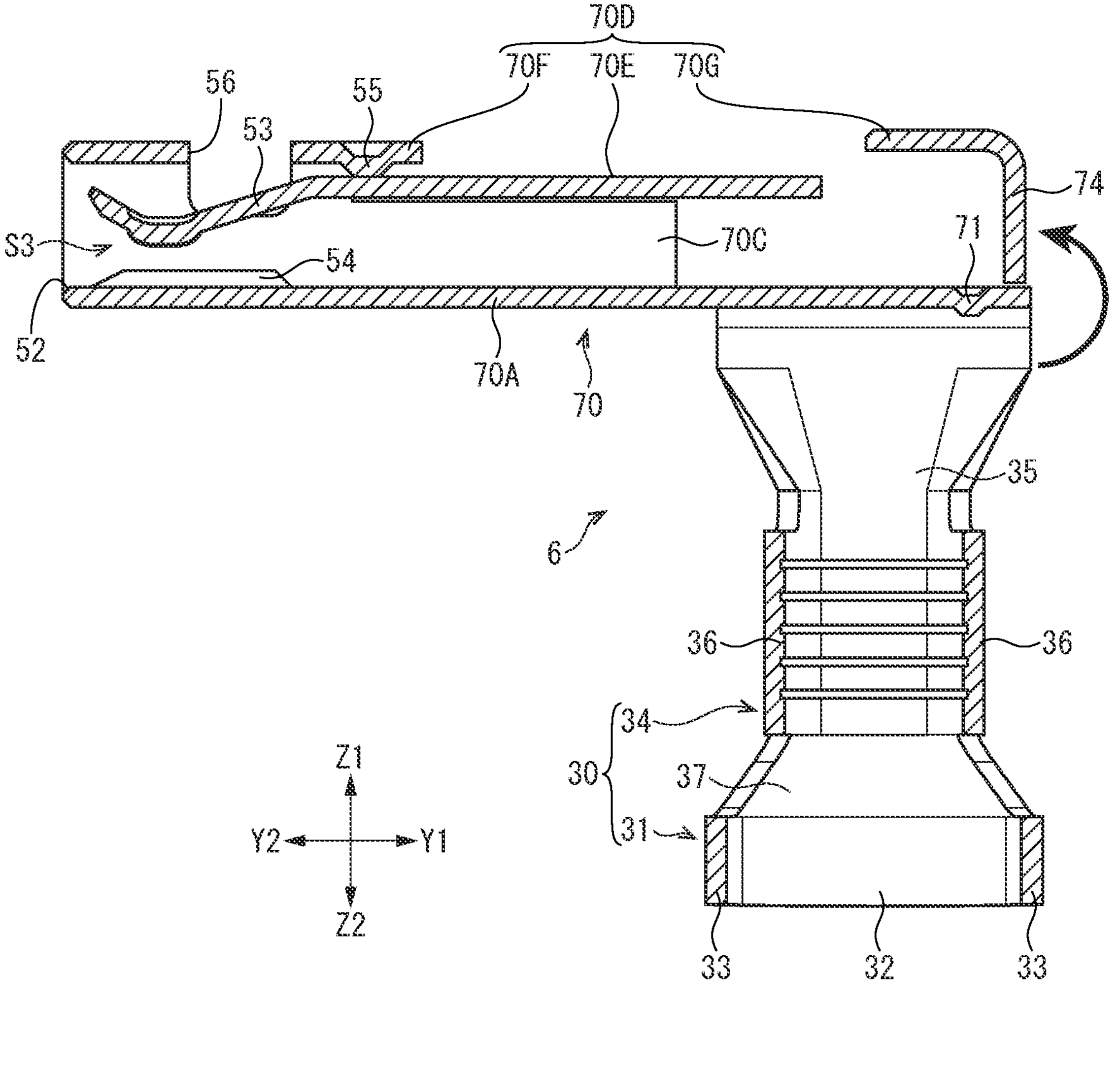
FIG. 11 is a cross-sectional view showing the crimp terminal according to the modified example of the embodiment of the present invention.
Figure 12:
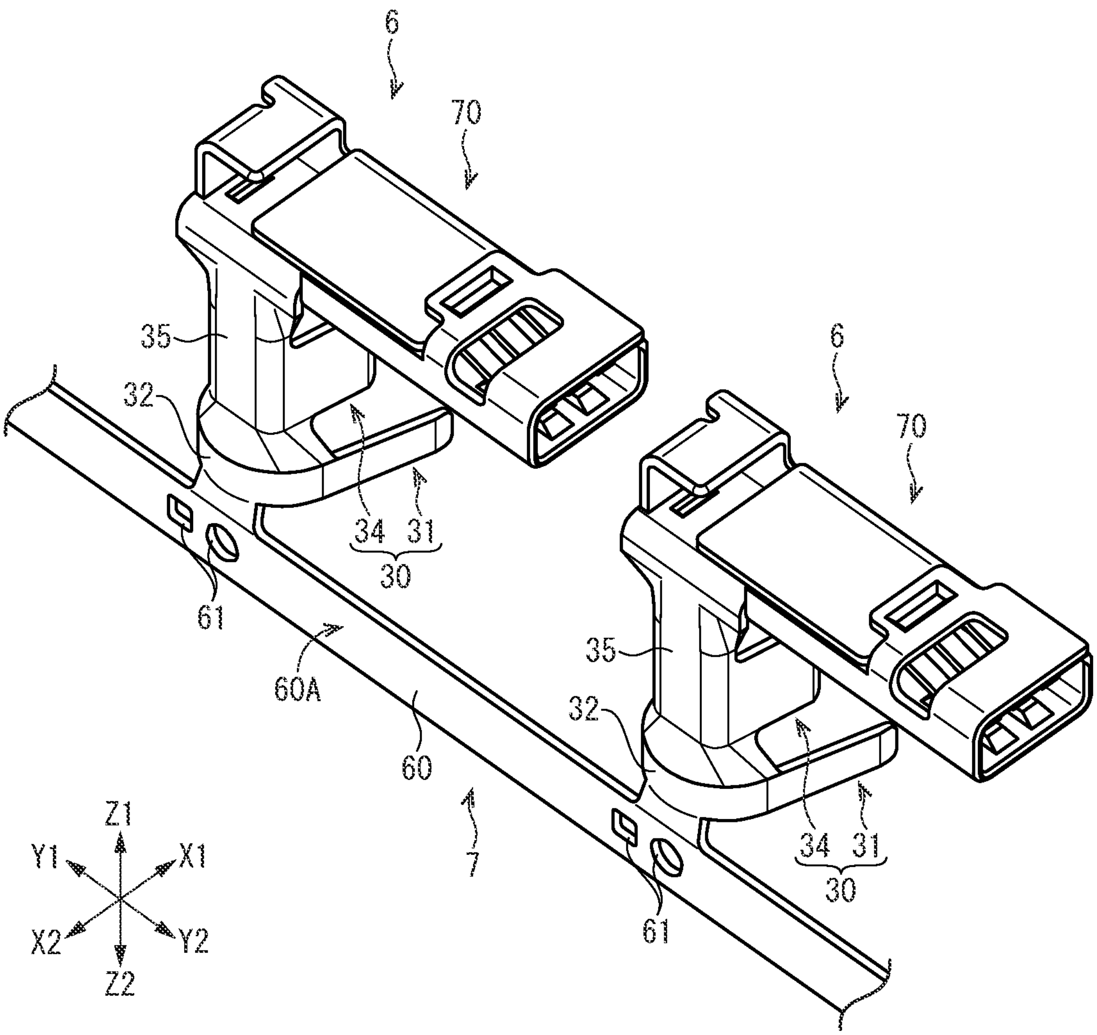
FIG. 12 is a perspective view showing the terminal coupled body according to the modified example of the embodiment of the present invention.

[Modified Example] Next, with reference to FIG. 10A, FIG. 10B, FIG. 11 and FIG. 12, the crimp terminal 6 (the terminal coupled body 7) according to a modified example will be described. FIG. 10A and FIG. 10B are perspective views showing the crimp terminal 6. FIG. 11 is a cross-sectional view showing the crimp terminal 6. FIG. 12 is a perspective view showing the terminal coupled body 7. In the description of the crimp terminal 6 and the terminal coupled body 7 in the modified example, the same reference numbers are assigned to the same or corresponding configurations as the crimp terminal 3 and the terminal coupled body 5 described above, and these descriptions are omitted.

As shown in FIG. 10A, FIG. 10B and FIG. 11, the crimp terminal 6 includes the crimped part 30 crimped to the cable 4 (not shown in FIG. 10A to FIG. 12), and a terminal connection part 70 provided to be bent with respect to the crimped part 30, and the coupling part 40 is not provided. The crimp terminal 6 is formed by punching out a single metal plate and then bending it. That is, the crimped part 30 and the terminal connection part 70 are formed integrally.

<Crimped Part> The upper portion of the core wire base part 35 of the crimped part 30 is formed in an approximately trapezoidal shape whose width is increased in the front-and-rear direction (the third axial direction) upward (one direction of the first axial direction). In the crimp terminal 3 described above, each of the barrel pieces 33, 36 is extended rightward (one direction of the second axial direction), while in the crimp terminal 6 according to the modified example, each barrel piece 33, 36 is extended leftward. Therefore, in the crimp terminal 6 in the modified example, "one direction of the second axial direction" in the claims refers to the left, and "the other direction of the second axial direction" refers to the right. Although not shown, the position of the positioning ribs 16 is changed such that the crimp terminal 6 can be housed in the housing body part 12 of the housing 2.

<Terminal Connection Part> The terminal connection part 70 is formed into an approximately rectangular cylindrical shape having an approximately rectangular cross section whose longer sides are along the left-and-right direction by bending a bottom plate 70A, a left side plate 70B, a right side plate 70C and an upper plate 70D in a roll, in the same manner as the terminal connection part 50 of the crimp terminal 3 described above. The connection space S3 is formed inside the terminal connection part 70, and the connection opening 52 is opened on the front end surface (one end surface in the third axial direction) of the terminal connection part 70.

(Bottom Plate) The bottom plate 70A, as an example of the first flat plate, is connected to the upper end of the core wire base part 35, and is bent approximately at right angles leftward (the extending direction of each of the barrel pieces 33, 36) with respect to the core wire base part 35. The bottom plate 71A is extended from the upper end (one end in the first axial direction) of the core wire base part 35 leftward (one direction of the second axial direction) and rearward (one direction of the third axial direction). The bottom plate 70A is provided to cover the upper end surface of the crimped part 30. In the rear portion of the bottom plate 70A, the two pressure-contact protrusions 54 are protruded toward the connection space S3 (upward), and in the front portion of the bottom plate 70A, a bottom protruding part 71 is protruded downward (see FIG. 10A and FIG. 11).

(A Pair of Side Plates) The left side plate 70B is connected to the left end of the bottom plate 70A, and is bent approximately at right angles upward with respect to the bottom plate 70A. The right side plate 70C is connected to the right end of the bottom plate 70A, and is bent approximately at right angles upward with respect to the bottom plate 70A. The pair of left and right side plates 70B and 70C is extended upward (one direction of the first axial direction) from both ends of the bottom plate 70A in the left-and-right direction (the second axial direction). In addition, a side protruding part 72 is protruded leftward from the front portion of the left side plate 70B (see FIG. 10B). Since the core wire base part 35 is connected to the front portion of the right end of the bottom plate 70A, the right side plate 70C is connected to the right end of the bottom plate 70A on the rear side of the core wire base part 35 (see FIG. 10A).

(Upper Plate) The upper plate 70D, as an example of the second flat plate, faces the bottom plate 70A with a gap (the connection space S3). The upper plate 70D has an inner upper plate 70E, an outer upper plate 70F, and a reinforcing upper plate 70G.

The inner upper plate 70E is connected to the center portion of the upper end of the left side plate 70B in the front-and-rear direction, and is bent rightward approximately at right angles with respect to the left side plate 70B. The inner upper plate 70E is extended rightward from the upper end of the left side plate 70B, and the right end portion of the inner upper plate 70E is overlapped on the upper surface of the rear portion of the right side plate 70C. In the rear portion of the inner upper plate 70E, the three pressure-contact pieces 53 are provided at intervals in the left-and-right direction. Incidentally, a notch 73 is recessed in the above-described left side plate 70B at a position adjacent to the rear end of the inner upper plate 70E (see FIG. 10B).

The outer upper plate 70F is connected to the rear portion of the upper end of the right side plate 70C, and is bent approximately at right angles leftward with respect to the right side plate 70C. The outer upper plate 70F is extended leftward from the upper end of the right side plate 70C, and the left end portion of the outer upper plate 70F is overlapped (covers) on the upper end surface of the left side plate 70B. The outer upper plate 70F is arranged on the rear side of the inner upper plate 70E, and the front portion of the outer upper plate 70F is overlapped on the rear upper surface of the inner upper plate 70E. The support protruding part 55 coming into contact with the upper surface of the inner upper plate 70E is protruded on the front portion of the outer upper plate 70F (see FIG. 10B and FIG. 11). The outer upper plate 70F is in contact with the inner upper plate 70E only by the support protruding part 55. In addition, the locking hole 56 is drilled at the rear portion of the terminal connection part 70 from the upper portion of the right side plate 70C to the outer upper plate 70F (see FIG. 10B and FIG. 11).

The reinforcing upper plate 70G is connected to the front portion of the upper end of the left side plate 70B, and is bent approximately at right angles rightward with respect to the left side plate 70B. The reinforcing upper plate 70G is extended rightward from the upper end of the left side plate 70B. The reinforcing upper plate 70G is arranged in front of the inner upper plate 70E, and the rear end of the reinforcing upper plate 70G is separated from the front end of the inner upper plate 70E in the front and upper direction (see FIG. 11).

(Reinforcing Piece) The terminal connection part 70 further has a reinforcing piece 74 extending from the reinforcing upper plate 70G toward the bottom plate 70A. The reinforcing piece 74 is connected to the front end of the reinforcing upper plate 70G, and is bent approximately at right angles downward with respect to the reinforcing upper plate 70G. The reinforcing piece 74 is extended downward from the front end of the reinforcing upper plate 70G, and the tip end (lower end) of the reinforcing piece 74 faces the bottom plate 70A with a small gap (for example, about 0.1 to 1.0 mm) (see FIG. 10B and FIG. 11). When the crimp terminal 6 is viewed from the right side, an opening communicating with the connection space S3 is formed in the area surrounded by the bottom plate 70A (the core wire base part 35), the right side plate 70C, the inner upper plate 70E, the reinforcing upper plate 70G and the reinforcing pieces 74 (see FIG. 10A). In addition, the front end of the above-described bottom plate 70A is located slightly forward (on the side of the cover 11) from the front surface (outer surface) of the reinforcing piece 48.

As shown in FIG. 12, the crimp terminals 6 in the modified example are connected to the carrier 60 to form the terminal coupled body 7, similar to the crimp terminal 3 described above. Similar to the terminal coupled body 5 described above, the terminal coupled body 7 in the modified example is wound around the reel 62 in such a manner that each of the barrel piece 33, 36 of the crimp terminal 6 connected to the carrier 60 faces outward (not shown).

Similar to the crimp terminal 3 described above, the crimp terminal 6 in the modified example is crimped to the cable 4 by the terminal crimping device, and housed in the housing 2 to constitute the connector 1 (not shown). In a state where the terminal connection part 70 of the crimp terminal 6 is inserted into the second housing space S2 of the fitting protruding part 13 of the housing 2, the reinforcing upper plate 70G, the bottom protruding part 71 and the side protruding part 72 are in close to (or in contact with) the inner surface of the fitting protruding part 13 with a slight gap (not shown). Thus, the terminal connection part 70 is positioned in the second housing space S2. In addition, in a state where the cover part 11 is attached to the housing part 10, each pressing part 27 of the cover part 11 (the front end of the bottom plate 70A) is in close to (or in contact with) the reinforcing piece 74 of the crimp terminal 6 housed in the housing part 10 with a slight gap (not shown). Thus, each crimp terminal 6 is positioned inside the housing 2.

By the way, the connector 1 (so-called right-angle connector) equipped with the L-shaped crimp terminal 6 can be easily connected to the counter connector 90 mounted on the electrical board 99 without bending the cable 4 forcibly. In addition, by bending the housing 2 and the crimp terminal 6 in an L-shape, the total height of the connector 1 can be kept low (the dimension in the upper-and-lower direction is shortened). Here, for example, in a state where the connector 1 is connected to the counter connector 90, a work such as aligning the cable 4 may be carried out. In this case, the cable 4 may be pulled in a direction (the separation direction of the connector (the front direction in FIG. 10, for example)) crossing the extending direction (the upper-and-lower direction in FIG. 10B, for example) by inadvertently touching of the hand on the cable 4. Then, the crimped part 30 crimped to the cable 4 may be applied with a force for turning it with respect to the terminal connection part 70 (see the thick arrow shown in FIG. 11), and the crimp terminal 6 may be deformed to open the angle formed between the crimped part 30 and the terminal connection part 70 in the housing 2. As a result, there is a possibility that the cover part 11 of the housing 2 would be detached from and the crimp terminal 6 would be separated from the housing 2.

In response to the above problem, the crimp terminal 6 in the modified example is configured such that the reinforcing piece 74 is extended from the front end of the reinforcing upper plate 70G toward the bottom plate 70A, and its tip faces the bottom plate 70A with a slight gap (see FIG. 11). According to this configuration, even if the cable 4 is pulled and the crimped part 30 is turned so as to be opened with respect to the terminal connection portion 70, the tip end of the reinforcing piece 74 abuts on the bottom plate 70A, the reinforcing piece 74 installed between the bottom plate 70A and the reinforcing upper plate 70G can restrict the turning of the crimped part 30. This makes it possible to resist the turning force acting on the crimped part 30 and to suppress excessive deformation of the crimp terminal 6. As a result, the separation of the crimp terminal 6 from the housing 2 can be suppressed.

In the crimp terminal 6 according to the modified example of the present embodiment, the inner upper plate 70E is connected to the upper end of the left side plate 70B, and the outer upper plate 70F is connected to the upper end of the right side plate 70C, but the present invention is not limited to these. For example, the inner upper plate 70E may be connected to the upper end of the right side plate 70C, and the outer upper plate 70F may be connected to the upper end of the left side plate 70B (not shown). For example, the inner upper plate 70E and the outer upper plate 70F may be connected only to either the left side plate 70B or the right side plate 70C (not shown). The upper plate 70D includes the reinforcing upper plate 70G, but the present invention is not limited to this. The reinforcing upper plate 70G may not be provided (not shown). In this case, the reinforcing piece 74 may be connected to the inner upper plate 70E (not shown).

In addition, in the crimp terminal 6 according to the modified example of the present embodiment, the reinforcing piece 74 is extended from the front end (the other end in the third axial direction) of the reinforcing upper plate 70G (the second flat plate) toward the bottom plate 70A (the first flat plate), but the present invention is not limited to this. For example, the reinforcing piece 74 may be extended from the front end of the bottom plate 70A (the first flat plate) toward the reinforcing upper plate 70G (the second flat plate). In addition, a plurality of the reinforcing pieces 74 may be provided, for example, the reinforcing piece 74 extending from the reinforcing upper plate 70G toward the bottom plate 70A and the reinforcing piece 74 extending from the bottom plate 70A toward the reinforcing upper plate 70G may be provided (not shown). For example, the reinforcing piece 74 may be extended from the front end of the left side plate 70B toward the right side plate 70C (not shown). The tip end of the reinforcing piece 74 is separated from the bottom plate 70A, but this invention is not limited to this. It may be in contact with the bottom plate 70A (not shown). If the joint between the crimped part 30 and the terminal connection part 70 has a sufficiently rigidity, the reinforcing piece 74 may not be provided (not shown). In this case, each pressing part 27 of the cover part 11 should be pressed against the front end surface of the terminal connection part 70 of the crimp terminal 6 (not shown).

In the crimp terminals 3 and 6 according to the present embodiment (including the modified example), the step (the inclined plate part 37) is provided between the covering base part 32 and the core wire base part 35 of the crimped part 30 (see FIG. 4A, or the others), but the present invention is not limited to this. The covering base part 32 and the core wire base part 35 may be provided to form the same plane (not shown). Also, the pair of covering barrel pieces 33 and the pair of the core wire barrel pieces 36 are provided, but the present invention is not limited to this. For example, one covering barrel piece 33 and one core wire barrel piece 36 may be provided (not shown). Also, although the crimped part 30 is formed by the covering crimped part 31 and the core wire crimped part 34, the present invention is not limited to this. The covering crimped part 31 may not be provided and the crimped part 30 may be formed by only the core wire crimped part 34 (not shown). In this case, the base end (lower end) of the core wire base part 35 is connected to the carrier 60 (not shown).

In the crimp terminal 3 according to the present embodiment, the bridge plate 44 is integrally formed with the front support plate 43, but the present invention is not limited to this. The bridge plate 44 may be integrally formed with the rear support plate 43 (not shown). The front support plate 43 and the bridge plate 44 may not be provided, and the first support part 41 may be formed by only the rear support plate 43 (not shown).

In the crimp terminal 3 according to the present embodiment, the second support part 42 is connected to the rear support plate 43, and extended rearward, but the present invention is not limited to this. The second support part 43 may be connected to the front support plate 43, and extended forward (not shown). In this case, the terminal connection part 50 is also extended forward (not shown).

Figure 13A:
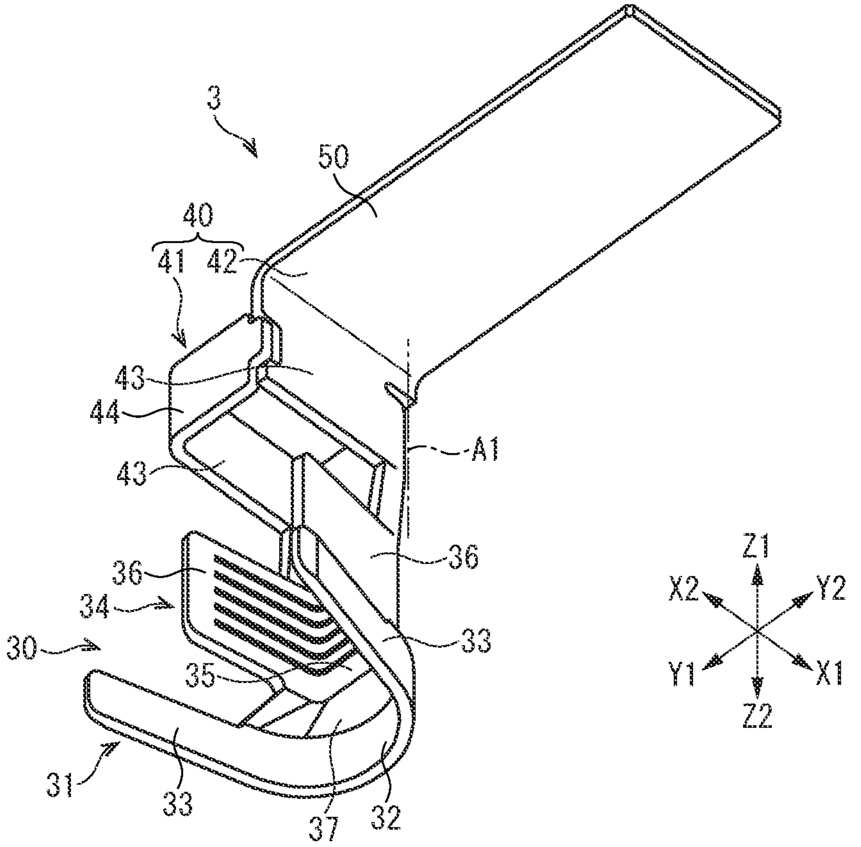
FIG. 13A is a perspective view showing the crimp terminal according to another modified example of the embodiment of the present invention.
Figure 13B:
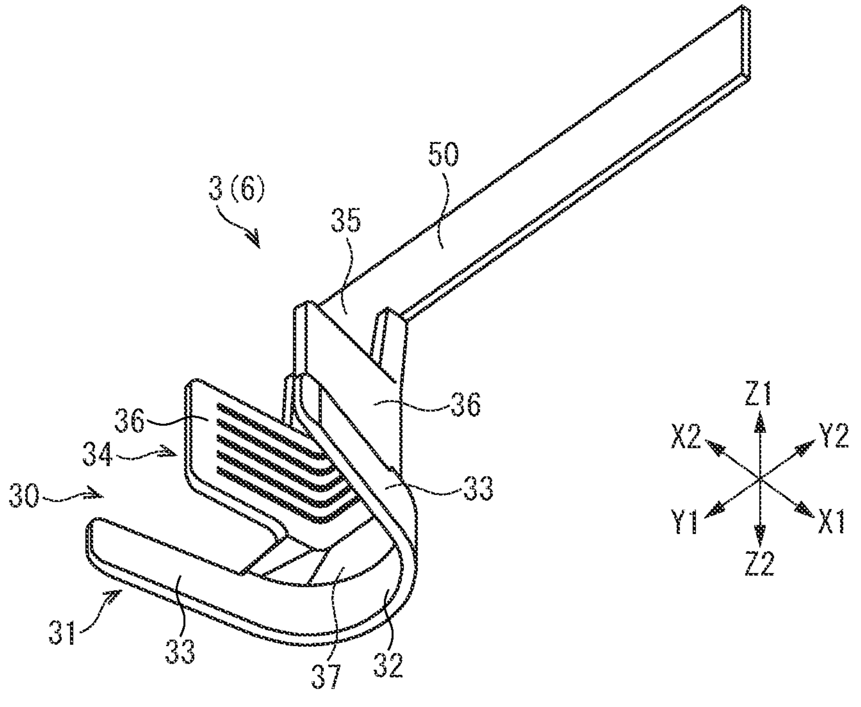
FIG. 13B is a perspective view showing the crimp terminal according to still another modified example of the embodiment of the present invention.

In addition, the crimp terminals 3 and 6 according to the present embodiment (including the modified example), the terminal connection part 50 is formed in an approximately rectangular cylindrical shape, but the present invention is not limited to this. The terminal connection parts 50 and 70 may be configured to be electrically connected to the counter terminal. For example, if the counter terminal is formed to hold the terminal connection parts 50, 70 from both sides, the terminal connection part 50 may be formed in a single plate shape as shown in FIG. 13A (another modified example). In addition, as shown in FIG. 13B, the coupling part 40 may not be provided, and the terminal connection part 50 (70) may be extended from the core wire base part 35 directly rearward (the extending direction of the carrier 60) (still another modified example). That is, the core wire base part 35 and the terminal connection part 50 (70) may be formed in an L-shaped plate. In various modified examples, the terminal connection part 50 is not limited to a plate shape, but may be a single bar shape (not shown).

Also, in the crimp terminals 3 and 6 according to the present embodiment (including the modifies examples, the same shall apply hereafter), the terminal connection parts 50 and 70 are bent approximately at right angles with respect to the crimped part 30, but it is not limited to a right angle, and may be at a slightly obtuse angle or at an acute angle (not shown).

Moreover, although the terminal coupled bodies 5 and 7 according to the present embodiment are wound around the reel 62, they may be used without being wound around the reel 62 and be used in a state where the carrier 60 may be extended in one direction (planar) and the multiple crimp terminals 3 are arranged side by side in a row as shown in FIG. 6 and FIG. 12.

It should be noted that the description of the above embodiment shows one aspect of the crimp terminal, the terminal coupled body, and the connector according to the present invention, and the technical scope of the present invention is not limited to the above embodiment. Components in the above embodiment can be replaced or combined with existing components, etc., as appropriate, and the description of the above embodiment does not limit the content of the invention described in the claims.

The invention claimed is:

1. A crimp terminal comprising:

a crimped part crimped to a cable; and a terminal connection part provided to be bent with respect to the crimped part; and a coupling part coupling the crimped part to the terminal connection part, wherein the crimped part includes:

a base part on which the cable extending in a first axial direction is placed; and a barrel piece protruding from the base part in one direction of a second axial direction orthogonal to the first axial direction, and caulked to be crimped to the cable, the coupling part is bent with respect to the base part in one direction of the second axial direction around a first axis extending in the first axial direction while a tip end of the coupling part is directed to one direction of a third axial direction orthogonal to the first axial direction and the second axial direction, the terminal connection part is extended from the tip end of the coupling part in one direction of the third axial direction, the coupling part includes:

a first support part protruding from the base part in one direction of the second axial direction on one side of the barrel piece in the first axial direction; and a second support part extending from one end in the first axial direction of the first support part to one direction of the third axial direction, the terminal connection part is extended from a tip end of the second support part to one direction of the third axial direction, the first support part includes:

a pair of support plates protruding from both ends in the third axial direction of the base part to one direction of the second axial direction; and a bridge plate provided between tip ends of the support plates, and the second support part is connected to one of the support plates.

2. A crimp terminal comprising:

a crimped part crimped to a cable; and a terminal connection part provided to be bent with respect to the crimped part, wherein the crimped part includes:

a base part on which the cable extending in a first axial direction is placed; and a barrel piece protruding from the base part in one direction of a second axial direction orthogonal to the first axial direction, and caulked to be crimped to the cable, the terminal connection part is extended in one direction of a third axial direction orthogonal to the first axial direction and the second axial direction, the terminal connection part is formed in a rectangular cylindrical shape having a connection space inside and a connection opening opened to one end surface in the third axial direction, the terminal connection part includes:

a first flat plate extending from one end in the first axial direction of the base part to one direction of the second axial direction and extending to one direction of the third axial direction;

a pair of side plates extending from both ends in the second axial direction of the first flat plate to one direction of the first axial direction; and a second flat plate connected to one end in the first axial direction of at least one of the side plates and facing the first flat plate with a gap, the terminal connection part further includes a reinforcing piece extending from the other end in the third axial direction of one of the first flat plate and the second flat plate toward the other of the first flat plate and the second flat plate, and a tip end of the reinforcing piece faces the other of the first flat plate or the second flat plate with a slight gap or in contact with.

3. A terminal coupled body in which a plurality of the crimp terminal according to claim 2 is connected to a carrier formed in a band shape extending in the third axial direction at intervals in the third axial direction, wherein the crimp terminal is connected to the carrier such that the base part is in a posture parallel to a surface of the carrier and a base end of the base part, which is the other end in the first axial direction, is connected to one end in the first axial direction of the carrier.

4. The terminal coupled body according to claim 3, wound around a reel with the barrel piece of the crimp terminal connected to the carrier facing outward.

5. A connector comprising:

the crimp terminal according to claim 2; and a housing for housing the crimp terminal.

* * * * *